United States Patent Office 3,417,061
Patented Dec. 17, 1968

3,417,061
PROCESS FOR PREPARING POLYOLEFIN SULFONAMIDES SOLUBLE IN CHLOROHYDROCARBONS
Claus Beermann, Neu-Isenburg, and Franz Landauer and Erwin Schmidt, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 16, 1965, Ser. No. 448,852
Claims priority, application Germany, Apr. 25, 1964, F 42,725
3 Claims. (Cl. 260—79.3)

ABSTRACT OF THE DISCLOSURE

An improved process has been provided for preparing a polyolefin sulfonamide soluble in chlorinated hydrocarbons wherein a low pressure polyolefin sulfochloride is sulfochlorinated by reacting a polyolefin with chlorine and sulfur dioxide in a chlorohydrocarbon solution in which the reaction is carried out as well as in which the sulfochloride is in solution and wherein the polyolefin is a polyolefin produced according to a low pressure polymerization process, the improvement of which comprises the steps of: amidating by mixing said polyolefin sulfochloride with ammonia and a primary or secondary amine while said polyolefin sulfochloride is still in its sulfochlorination process solution.

The present invention relates to a process for preparing polyolefin sulfonamides soluble in chlorohydrocarbons.

It is known to react sulfochlorinated high pressure polyethylenes of relatively low molecular weight with ammonia or amines. The sulfamides obtained are neither soluble in chlorohydrocarbons nor in aliphatic or aromatic hydrocarbons. It is likewise known to produce molding material capable of being vulcanized with sulfur when polyolefin sulfochlorides are reacted in aromatic hydrocarbons with unsaturated amines. Still further, elastomers can be produced by reacting polyethylene sulfochlorides and secondary amines in carbon tetrachloride.

It has now been found that polyolefin sulfonamides can advantageously be prepared by reacting polyolefin sulfochlorides with ammonia and/or amines in chlorohydrocarbons when using sulfochlorides of polymers of olefins, prepared by a low pressure process and having 3 to 6 carbon atoms, or of copolymers of at least 2 olefins with 2 to 10 carbon atoms, and possibly diolefins.

Suitable polyolefin sulfochlorides are, for example, sulfochlorides of copolymers of low molecular weight olefins and possibly dienes, such as ethylene/propylene copolymers or ethylene/propylene/dicyclopentadiene terpolymers, or sulfochlorides of homopolymers such as polypropylene, polybutene and polypentene. The polyolefin sulfochlorides are prepared according to a known process as described, for example, in Austrian Patent 203,709, German Patent 1,015,603 and French Patent 1,173,859. Suitable chlorohydrocarbons in which the sulfochlorination can be carried out are, for example, carbon tetrachloride, tetrachloroethane, or ortho-dichlorobenzene. The polyolefins are prepared by a low pressure process as claimed, for example, in German Patents 1,001,003 and 1,094,985 and British Patent 790,195. Suitable amidation agents are ammonia, primary or secondary aliphatic, aromatic or mixed aliphatic-aromatic amines, such as, for example, methylamine, dimethylamine, ethylamine, dibutylamine, di-2-ethylhexylamine, dodecylamine, methylaniline and piperidine.

The polyolefin sulfochlorides can be reacted in a manner such that the sulfochlorination solution, which has been freed from the excess of sulfur dioxide, chlorine, and gaseous hydrochloric acid, is allowed to flow, while stirred, into the amine suitably used in an excess and possibly diluted with an inert solvent. The temperatures used depend on the physical properties of the amine and the solvent and are in the range of from −60 to +150° C. and advantageously −40 to +80° C. The amidation can be carried out at atmospheric pressure or under elevated pressure. The properties of the polyolefin sulfonamides obtained depend on the polyolefin used, the sulfur and chlorine content thereof and on the amine.

The polyolefin sulfonamides obtained are soluble in higher ketones as well as in aliphatic and aromatic hydrocarbons such as gasoline and benzene, in chlorohydrocarbons such as methylene chloride, chloroform, carbon tetrachloride and chlorobenzene, and in organic esters, for example butyl acetate. Owing to the properties of solubility and to the selection of very different polyolefins, the sulfonamides according to the invention can be used in a much wider field of application than known polyethylene sulfonamides. For example, thermally decomposed polypropylenes having a low $\eta$ spec/c. value can be used for making polypropylene sulfonamides which contain about 2% of sulfur, 0.9% of nitrogen and 4% of chlorine and are suitable as adhesives. The same decomposed polypropylenes can be used for the manufacture of emulsifiers or thickening agents by introducing into the polypropylene a larger number of hydrophilic sulfonamide groups so that products are obtained containing 5% of sulfur and 2.3% of nitrogen. The polypropylene which has not been decomposed yields films of very good quality when a methylsulfonamide is prepared containing 1.5% of sulfur, 0.65% of nitrogen and 12% of chlorine in the chain. Copolymers can be transformed into sulfonamides which constitute very good raw materials. The polyolefin sulfonamides can also be used as thermoplasts. If desired, they can be cross-linked in known manner, for example with diisocyanates if the polyolefin sulfonamide carries at least one hydrogen atom at the nitrogen atom.

The following examples serve to illustrate the invention but they are not intended to limit it thereto.

Example 1

100 grams of an amorphous polypropylene ($\eta$ spec./c.=0.6, determined at 135° C. with a 0.1% solution in tetrahydronaphthalene) were dissolved in 500 cc. of carbon tetrachloride. 55 grams of chlorine and 21 grams of sulfur dioxide were introduced into the solution at 25–30° C. while irradiating with ultraviolet light. Nitrogen was passed through the reaction mixture and the solution of the sulfochlorinated polypropylene was added to 45 grams of 1,1-diethyl-ethylenediamine at 25° C. The temperature rose to 35° C. The mixture was stirred for a further 3 hours at 50° C. The substituted sulfonamide was isolated by precipitation with methanol. After drying the product contained 3.5% of sulfur, 3.2% of nitrogen and 12.4% of chlorine. From a solution in benzene the sulfonamide yielded a limpid film which was resistant to tearing.

Example 2

100 grams of crystalline polypropylene ($\eta$ spec./c.=1.7, determined at 135° C. with a 0.1% solution in tetrahydronaphthalene) were dissolved at 110° C. in 2 liters of o-dichlorobenzene. 55 grams of chlorine were introduced at 110° C. over a period of 2 hours. The reaction solution was cooled to 60° C. and 17 grams of sulfur dioxide and 19 grams of chlorine were introduced in 1 hour while irradiating with ultraviolet light. Nitrogen was then blown through the solution and at a temperature of −10 to −15° C. the solution of the polypropylene sulfochloride was added to 20 grams of liquefied monomethylamine. The reaction mixture was stirred for 1 hour and the amine in excess was blown out with nitrogen. The polypropylene methylsulfonamide was precipitated by pouring it into 2 liters of methanol, repeatedly washed with methanol and dried in a vacuum drier at 60° C. The methylsulfonamide obtained contained 2.8% of sulfur, 1.2% of nitrogen, and 10.7% of chlorine. When 28 grams of ethylamine were used instead of 20 grams of monomethylamine, the corresponding polypropylene ethylsulfonamide was obtained.

Example 3

700 grams of a solution of 100 grams of sulfochlorinated polypropylene containing 3.1% of sulfur and 8.4% of chlorine (the starting polypropylene had an $\eta$ spec./c. value of 0.3, determined at 135° C. with a 0.1% solution in decahydronaphthalene) in 600 grams of carbon tetrachloride was added in 1.5 hours at −5 to −10° C. to 25 grams of liquefied dimethylamine. The mixture was stirred for 15 minutes and the excess of amine was blown out with air. The reaction solution was poured into 1.5 liters of methanol. The precipitated polypropylene dimethylsulfonamide contained 1.3% of nitrogen and 2.8% of sulfur. After drying in a vacuum drier at 60° C. it was soluble without residue in chlorohydrocarbons, in gasoline (boiling point 90–100° C.) and in benzene. The solutions could be cast to yield limpid, tough and very tacky films which did not possess elastomeric properties.

Example 4

700 grams of the solution of a sulfochlorinated polypropylene as used in Example 3 were dropped over a period of 2 hours at −40 to −45° C. into 10 grams of liquefied ammonia. The reaction mixture was stirred for a further hour and the ammonia in excess was blown out with air. The polypropylene sulfonamide was precipitated with methanol. It contained 1.2% of nitrogen and 3% of sulfur. When cast from a solution in carbon tetrachloride, a tough and very tacky film was obtained.

Example 5

100 grams of an amorphous ethylene/propylene copolymer (containing 30 mol percent of $C_3$ hydrocarbon and having an $\eta$ spec./c. value of 2.8, determined at 135° C. with a 0.1% solution in tetrahydronaphthalene) were dissolved in 1.2 liters of carbon tetrachloride. At 60° C. 17 grams of sulfur dioxide and 19 grams of chlorine were introduced in 1 hour while irradiating with ultraviolet light. The copolymer obtained contained 2.2% of sulfur and 6.3% of chlorine. Nitrogen was blown through the solution and the solution was dropped at −10 to −15° C. into 15 grams of liquefied monomethylamine, while methylamine was continuously introduced. The reaction solution was stirred for 1 hour and then nitrogen was blown through at room temperature. The methylsulfonamide of the ethylene/propylene copolymer obtained was precipitated with methanol and dried at 60° C. in a vacuum drier. The methylsulfonamide contained 2.2% of sulfur and 1% of nitrogen. A film cast from benzene was limpid and elastic. When instead of the ethylene/propylene copolymer an ethylene/butene-(1) copolymer (with 10 mol percent of butene-(1), $\eta$ spec./c.=3.2, determined as defined above) was used under the same reaction conditions, the sulfonamide obtained yielded likewise an elastic film with good properties.

Example 6

100 grams of the copolymer used in Example 5 were dissolved in 1.2 liters of carbon tetrachloride. At 60° C. and with irradiation with ultraviolet light 55 grams of chlorine and 17 grams of sulfur dioxide were introduced in 2 hours. The copolymer then contained 1.8% of sulfur and 18.1% of chlorine. Nitrogen was blown through the solution and the solution in carbon tetrachloride was dropped at −15° C. into 15 grams of liquefied methylamine. The reaction mixture was stirred for 1 hour at −10 to −15° C. and then nitrogen was blown through. The methylsulfonamide of the copolymer was precipitated with methanol and dried as in the preceding examples. It contained 1.9% of sulfur and 0.85% of nitrogen. Cast from a benzenic solution the sulfonamide yielded a limpid film having elastic properties. A product of like quality was obtained when instead of the ethylene/propylene copolymer a terpolymer of ethylene/propylene/dicyclopentadiene was used (65:30:5 mol percent, $\eta$ spec./c.=3.8 determined as described above).

We claim:
1. In a process for preparing a polyolefin sulfonamide soluble in chlorinated hydrocarbons wherein a low pressure polyolefin sulfochloride is sulfochlorinated by reacting a polyolefin with chlorine and sulfur dioxide in a chlorohydrocarbon solution in which the reaction is carried out as well as in which the sulfochloride is in solution and wherein the polyolefin is a polyolefin produced according to a low pressure polymerization process, the improvement of which comprises the steps of: amidating by mixing said polyolefin sulfochloride with ammonia and a primary or secondary amine while said polyolefin sulfochloride is still in its sulfochlorination process solution.
2. The process according to claim 1 wherein ammonia or a primary or secondary amine is maintained as a liquid and said polyolefin sulfochloride solution is slowly added thereto.
3. The process according to claim 1 wherein the amidation is carried out at a temperature in the range from −60° C. to 150° C.

References Cited

UNITED STATES PATENTS

| | | | |
|---|---|---|---|
| 2,615,000 | 10/1952 | Bradley | 260—79.3 |
| 2,778,813 | 1/1957 | Gasper et al. | 260—79.3 |
| 2,852,497 | 9/1958 | Thompson | 260—79.3 |
| 2,981,720 | 4/1961 | Herzberg et al. | 260—79.3 |

JOSEPH L. SCHOFER, *Primary Examiner.*

D. K. DENENBERG, *Assistant Examiner.*

U.S. Cl. X.R.

177—122; 252—355